T. S. Lewis,
Well Tubing,
N°. 64,546.   Patented May 7, 1867.

Witnesses;

Inventor;
Tristram S. Lewis

United States Patent Office.

TRISTRAM S. LEWIS, OF CHELSEA, MASSACHUSETTS.

*Letters Patent No. 64,546, dated May 7, 1867.*

IMPROVEMENT IN WELL-TUBES.

*The Schedule referred to in these Letters Patent and making part of the same.*

TO ALL WHOM IT MAY CONCERN:

Be it known that I, TRISTRAM S. LEWIS, of Chelsea, in the county of Suffolk, and State of Massachusetts, have invented certain Improvements in Well-Tubes, of which the following is a full, clear, and exact description, reference being had to the accompanying drawings, making part of this specification, in which—

Figure 1:
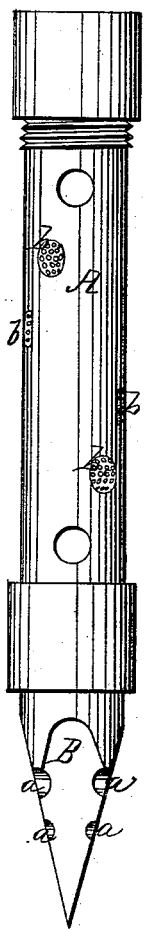
Figure 1 is an elevation of the lower end of a well-tube having my improvements applied thereto.
Figure 2:
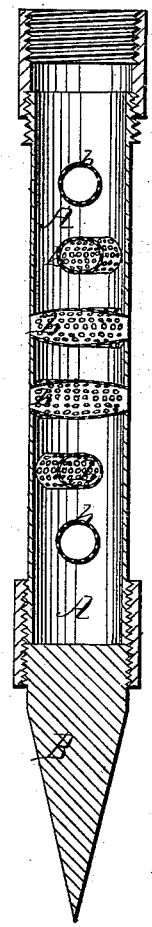
Figure 2 is a vertical section through the centre of the same.
Figure 3:
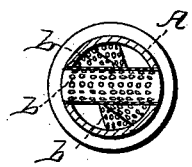
Figure 3 is a horizontal section through the same.

Well-tubes which are forced into the earth to a sufficient depth to reach water have generally been provided at their lower ends with a strainer of perforated metal or wire gauze placed around the outside for the purpose of excluding sand or other substances; this strainer, however, does not fully accomplish the purpose for which it is designed, for when these tubes pass through a stratum of clay it is liable to be forced through the strainer, obstructing the lower end of the tube and rendering it useless. The direct contact and pressure of the sand against a wire gauze strainer placed around the outside of a well-tube also prevents the water from passing freely into it.

My invention has for its object to overcome these difficulties, and consists in providing the lower end of the well-tube with one or more short perforated tubes passing through it horizontally or inclined at an angle, these tubes being filled with a substance soluble in water, which serves to exclude the clay or other substance while the tube is being forced down, the soluble substance being removed, when the well-tube has reached the required depth, by pouring in hot water or other liquid, so as to leave the short perforated tubes free and unobstructed for the passage of the water to the main tube.

To enable others skilled in the art to understand and use my invention, I will proceed to describe the manner in which I have carried it out.

In the said drawings, A is the lower end of the well-tube, which is formed in sections screwed together in the ordinary manner. B is the boring-tool, which is secured to the tube A, and is made square in cross-section, its corners being notched or cut away at $a$ to facilitate its being turned while passing through "hard-pan." $b$ is a series of short perforated tubes or strainers which pass through the main tube A in a horizontal direction, their ends being secured in place by solder or otherwise, and when the main tube is in place the water passes freely into its lower end through these perforated tubes $b$, this arrangement enabling me to prevent the direct contact and pressure of the sand against the strainers, which tends to prevent the free passage of the water. Previous to forcing the tube A into the earth, the tubes $b$ are filled with hard soap or other suitable substance soluble in water; this prevents the entrance of clay or other substance into the tubes $b$ while the main tube is being forced down, and when the latter has reached the required depth the tubes $b$ are cleared by pouring hot water or other liquid down the main tube A, which serves to melt and loosen the soluble material, leaving a free and unobstructed passage for the water into the main tube through the perforated tubes $b$. It is evident that if the well-tube is to be used where there is no liability of its passing through clay, the tubes $b$ may be left open instead of being filled with soap or other substance, without departing from the spirit of my invention. I prefer to fill them, however, as first described.

The tube A may be provided with any number of these tubes $b$, from one upwards, as may be found best suited to the purpose; and a well-tube thus constructed will be found to possess great advantages over those heretofore in use.

Claim.

What I claim as my invention, and desire to secure by Letters Patent, is—

The tube A, provided with one or more short perforated tubes $b$, operating substantially as described for the purpose set forth.

TRISTRAM S. LEWIS.

Witnesses:
P. E. TESCHEMACHER,
N. W. STEARNS.